United States Patent
Huang et al.

(10) Patent No.: US 10,376,855 B2
(45) Date of Patent: Aug. 13, 2019

(54) INTERNAL LOOP AIRLIFT REACTOR FOR PROCESS INTENSIFICATION INTEGRATING REACTION AND SEPARATION

(71) Applicants: QINGDAO INSTITUTE OF BIOENERGY AND BIOPROCESS TECHNOLOGY, CHINESE ACADEMY OF SCIENCES, Qingdao, Shandong (CN); INSTITUTE OF PROCESS ENGINEERING, CHINESE ACADEMY OF SCIENCES, Beijing (CN)

(72) Inventors: Qingshan Huang, Qingdao (CN); Tao Yang, Qingdao (CN); Fuhua Jiang, Qingdao (CN); Chao Yang, Beijing (CN)

(73) Assignees: QINGDAO INSTITUTE OF BIOENERGY AND BIOPROCESS TECHNOLOGY, CHINESE ACADEMY OF SCIENCE, Qingdao (CN); INSTITUTE OF PROCESS ENGINEERING, CHINESE ACADEMY OF SCIENCE, Beijing (CN)

( * ) Notice: Subject to any disclaimer, the term of this patent is extended or adjusted under 35 U.S.C. 154(b) by 0 days.

(21) Appl. No.: 16/323,212

(22) PCT Filed: Sep. 19, 2017

(86) PCT No.: PCT/CN2017/102163
§ 371 (c)(1),
(2) Date: Feb. 4, 2019

(87) PCT Pub. No.: WO2018/076962
PCT Pub. Date: May 3, 2018

(65) Prior Publication Data
US 2019/0209991 A1    Jul. 11, 2019

(30) Foreign Application Priority Data

Oct. 26, 2016 (CN) .......................... 2016 1 0941001

(51) Int. Cl.
*B01J 8/00* (2006.01)
*B01J 8/22* (2006.01)

(52) U.S. Cl.
CPC ............. *B01J 8/0055* (2013.01); *B01J 8/226* (2013.01); *B01J 2208/00761* (2013.01); *B01J 2208/00991* (2013.01)

(58) Field of Classification Search
CPC ........ B01J 8/226; B01J 8/0055; B01J 8/1854; B01J 2208/00761; B01J 2208/00991
See application file for complete search history.

(56) References Cited

U.S. PATENT DOCUMENTS 3,759,669 A * 9/1973 Aaron et al. ........... C10G 45/16
422/215

FOREIGN PATENT DOCUMENTS

CN    2791027 Y    6/2006
CN    203916929 U    11/2014
(Continued)

OTHER PUBLICATIONS

Dec. 29, 2017 Written Opinion issued in International Patent Application No. PCT/CN2017/102163.
(Continued)

*Primary Examiner* — Lessanework Seifu
(74) *Attorney, Agent, or Firm* — Oliff PLC

(57) ABSTRACT

An internal loop airlift reactor (ILAR) for process intensification integrating reaction and separation includes a riser, a downcomer, a hydrocyclone, internals preventing occurrence of dead zone, a gas guide cone, vent holes, and a gas-liquid integrated distributor. The hydrocyclone is arranged at the bottom of the ILAR downcomer; the gas (Continued)

guide cone and the vent holes in the downcomer prevent the gas from entering the hydrocyclone; after the slurry enters the hydrocyclone, the solid-containing slurry enters the riser again from the hydrocyclone underflow, and the solid-free clean product flows out through the hydrocyclone overflow. The ILAR in the present invention has a simple structure and low cost and requires no special liquid-solid separation device. It can achieve gas-liquid-solid three-phase reaction, interphase mass transfer, and solid-liquid separation simultaneously, and is suitable for a gas-liquid-solid three-phase reaction in which the catalyst is solid particles.

16 Claims, 2 Drawing Sheets

(56) References Cited

FOREIGN PATENT DOCUMENTS

| | | |
|---|---|---|
| CN | 105642201 | 6/2016 |
| CN | 105983377 | 10/2016 |
| CN | 106345375 A | 1/2017 |
| IN | 9602973 A | 8/2016 |
| JP | H05-293489 A | 11/1993 |

OTHER PUBLICATIONS

Dec. 29, 2017 Search Report issued in International Patent Application No. PCT/CN2017/102163.

\* cited by examiner

INTERNAL LOOP AIRLIFT REACTOR FOR PROCESS INTENSIFICATION INTEGRATING REACTION AND SEPARATION

The present application claims priority of Chinese patent application filed with the Chinese Patent Office on Oct. 26, 2016, with application No. 201610941001.5 and entitled "Internal Loop Airlift Reactor For Process Intensification Integrating Reaction and Separation", which is incorporated herein by reference in its entirety.

FIELD OF THE INVENTION

The present invention pertains to the field of gas-liquid-solid three-phase reaction, and particularly relates to an internal loop airlift reactor having both reaction and separation functions.

BACKGROUND OF THE INVENTION

The inner loop airlift reactor is a new type of reactor developed on the basis of a bubble column. It has a simple structure, no power device therein, and good mass transfer and heat transfer performance, and can be used for gas-liquid, gas-solid and gas-liquid-solid reactions. Therefore, it is widely used in various fields such as fermentation, energy, and sewage treatment.

In the gas-liquid-solid three-phase reaction in which the catalyst is solid particles, the catalyst needs to be recycled in the reactor, and thus the operation of solid-liquid separating is indispensable. There are many methods for separating the solid catalysts, such as sedimentation, filtration, membrane separation, etc., in which the sedimentation method is widely employed. The settlement can be divided into two methods: gravity sedimentation and centrifugal sedimentation. The efficiency of centrifugal sedimentation is far greater than that of gravity sedimentation. A hydrocyclone is a typical separation device using centrifugal sedimentation principle. It has a simple structure, low cost, small land occupancy area, and good separation performance, and is applied widely.

The invention patent of the application publication No. CN105642201A with the application publication date of Jun. 8, 2016 discloses a gas-liquid-solid three-phase loop reactor with flow guide cones. The upper part of a riser of the reactor is installed with a flow guide cone, and the lower part of a downcomer is also installed with a flow guide cone. The restriction of the flow guide cone is beneficial for the gas-liquid-solid mixture to form a circulating flow between the riser and the downcomer, thereby improving the mixing effect of the fluids. The invention patent of the publication No. CN105983377A with the application publication date of Oct. 5, 2016 discloses an internal loop airlift slurry reactor. Although the apparatus is a combination of an internal loop airlift reactor and a hydrocyclone, it has a gas-liquid separation section, a draft tube, and a gas distributor successively disposed inside a housing from top to bottom. A baffled communication section is specifically designed on the upper part of the draft tube, thereby improving the efficiency of gas-liquid separation. A hydrocyclone is disposed on the upper part of the apparatus, for re-separation of gas and liquid, which can effectively solve the problem of entrainment.

In the gas-liquid-solid three-phase reaction, especially for the three-phase reaction in which the catalyst is solid particles, separation of the solid particles from the liquid phase is very important. In the patent CN105642201A, the mixing in the three-phase reaction system is good, but solid-liquid separation cannot be carried out simultaneously in the reactor and correspondingly process intensification of mixing and separating cannot be realized. For the reaction that requires solid separation and recycling, such as Fischer-Tropsch synthesis, an external separation device is highly desired. This method requires additional power and also leads to a more complicated process, which is time-consuming and laborious and increases the land area and operating costs. In an apparatus of patent CN105983377A, although a hydrocyclone with separation effect is added therein, the hydrocyclone is located in a gas-liquid separation zone at the upper part of the reactor and only has the effect of gas-liquid separation. In addition, due to the presence of gas phase, the separation performance of the hydrocyclone is evidently reduced, and the application to the gas-liquid-solid three-phase reaction is limited, especially for situations where fine catalyst particles are present.

SUMMARY OF THE INVENTION

To solve the above problems, the present invention proposes a new type of internal loop airlift reactor for process intensification integrating reaction and separation functions. This reactor integrates the mixing, mass transfer between phases, reaction, and separation of the solid catalyst from the liquid product into one reactor, and hence multiple processes can be achieved in one apparatus. Correspondingly, process intensification of gas-liquid-solid three-phase reaction and solid-liquid separation is achieved without affecting the reaction.

The objective of the present invention is achieved by the following technical solution:

An internal loop airlift reactor for process intensification integrating reaction and separation functions comprises a riser, a downcomer, a solid feed inlet, a hydrocyclone inlet, internals preventing the occurrence of dead zone, a liquid inlet, a gas inlet, a gas outlet, a draft tube, a gas guide cone, vent holes, an overflow pipe, a hydrocyclone, an underflow pipe, a gas-liquid integrated distributor and a liquid outlet, wherein the riser and the downcomer are separated by the draft tube; the solid feed inlet is disposed on a side wall of the reactor; the liquid inlet and the gas inlet are disposed at the bottom of the reactor; the gas outlet is disposed at the top of the reactor; a liquid outlet locates at the bottom of the downcomer and guides the clear liquid free of solid particles to the outside of the reactor; the hydrocyclone is arranged at the lower part of the downcomer; the space between the upper surface of the cylindrical segment of the hydrocyclone and the wall surface of the downcomer is sealed except for the inlets; the gas guide cone is arranged on the inner wall of the downcomer; the vent holes are designed in the inner wall of the downcomer and arranged below the gas guide cone; and the gas-liquid integrated distributor connects the liquid inlet and the gas inlet and is arranged at the bottom of the reactor.

Further, the fluid rises in an annulus rising or center rising manner.

Further, the internals preventing the occurrence of dead zone is arranged below the underflow pipe of the hydrocyclone.

Further, the bottom surface area of the internals of preventing the dead zone is designed to be larger than the sectional area of the downcomer, and the base angle is about 15°-45°.

Further, the structure size and number of the hydrocyclone can be adjusted according to the handling capacity.

Further, the hydrocyclone is designed with at least one inlet.

Further, the gas guide cone is installed about 200-500 mm above the hydrocyclone, and the taper angle of the gas guide cone is about 15°-45°.

Further, the vent holes are about 2-10 mm below the gas guide cone in the downcomer, arranged in 4-12 circular arrays and have a diameter of about 1-10 mm.

Further, a hollow structure is present between the taper portion of the hydrocyclone and the downcomer, and the separated light phase product is led out via this location.

The present invention couples the mixing, gas-liquid-solid reaction, separation of the solid catalyst from the liquid phase. This invention retains the characteristic of low-energy in the internal loop airlift reactor and features of simple structure, high efficiency, and no moving parts in the hydrocyclone. Additionally, directional flow in the internal loop airlift reactor ensures a good performance of fluid mixing, interphase mass transfer, and heat transfer, and it does not need to arrange additional separation device to separate the solid catalyst from the liquid phase and solid conveying facilities outside the slurry reactor to recycle solid particles back into the slurry reactor, which also reduces power consumption and floor space. The entrainment of gas has a significant influence on the performance of solid-liquid separation in the hydrocyclone. The presence of the gas guide cone and the vent holes causes the gas to accumulate under the gas guiding cone and enter into the riser from the downcomer through the vent holes, thereby ensuring the efficiency of solid-liquid separation of the hydrocyclone and greatly expanding the range of application of the solid catalyst. The invented reactor can be used in the catalytic process using ultra-fine solid catalysts.

Figure 1:
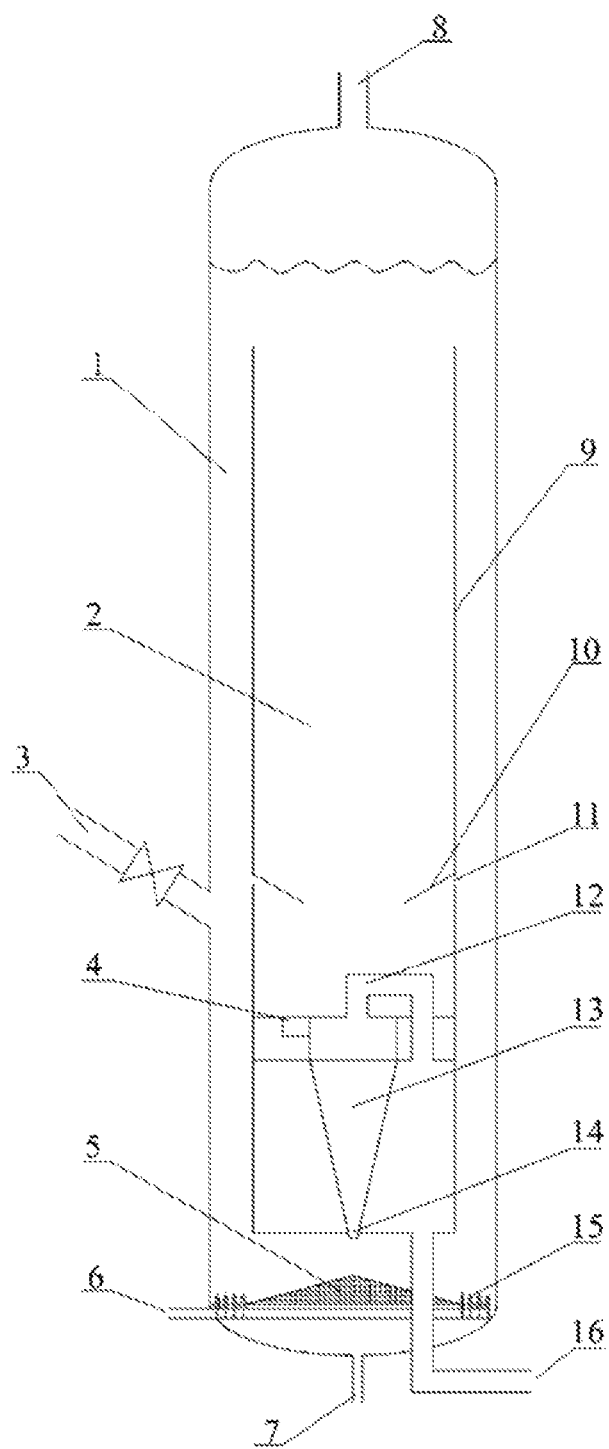
FIG. 1 is a structural diagram of embodiment 1 of the present invention.
Figure 2:
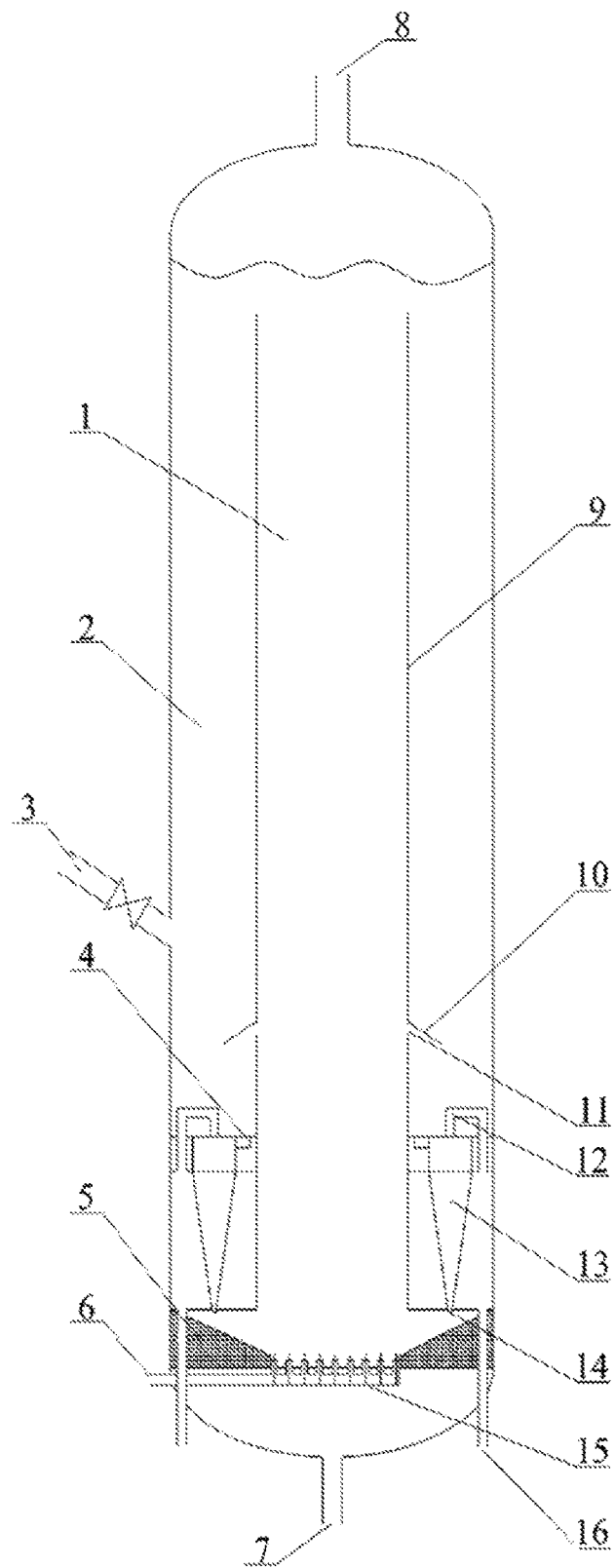
FIG. 2 is a structural diagram of embodiment 2 of the present invention.

Reference signs: 1 riser, 2 downcomer, 3 solid feed inlet, 4 hydrocyclone inlet, 5 internals preventing the occurrence of dead zone, 6 liquid inlet, 7 gas inlet, 8 gas outlet, 9 draft tube, 10 gas guide cone, 11 vent hole, 12 overflow pipe, 13 hydrocyclone, 14 underflow pipe, 15 gas-liquid integrated distributor, 16 liquid outlet

DETAILED DESCRIPTION OF THE EMBODIMENTS

For the sake of simplicity and easy-to-understanding, the objective, features, and advantages of the present invention, the detailed description of the embodiments will be given below in conjunction with the attached drawings.

The present invention will be further described in conjunction with the accompanying drawings and embodiments.

The slurry reactor in the present invention for process intensification integrating reaction and separation combines the internal loop airlift reactor and the hydrocyclone. The reactor comprises a riser (1), a downcomer (2), a solid feed inlet (3), hydrocyclone inlets (4), internals (5) preventing the occurrence of dead zone, a liquid inlet (6), a gas inlet (7), a gas outlet (8), a draft tube (9), a gas guide cone (10), vent holes (11), an overflow pipe (12), a hydrocyclone (13), an underflow pipe (14), a gas-liquid integrated distributor (15) and a liquid outlet (16).

Embodiment 1

As shown in FIG. 1, after passing through the gas-liquid integrated distributor (15), gas enters the riser of the internal loop airlift reactor from the annulus; the liquid, driven by the gas, flows from the riser (1) to the downcomer (2). A seal structure is formed between the cylindrical segment of the hydrocyclone (13) and the inner wall of the downcomer (2). The slurry, horizontal tangent to the column, enters the hydrocyclone (13) from the four hydrocyclone inlets (4). After separation, the slurry that contains solid catalyst particles is discharged from the underflow pipe (14) of the hydrocyclone. The internals (5) preventing the occurrence of dead zone can effectively prevent the catalyst particles from accumulating at the lower part of the underflow pipe (14) of the hydrocyclone and guide them into the riser, thereby ensuring that the catalyst can be fully recycled. The product after reaction as a light phase passes through the hollow structure between the hydrocyclone (13) and the downcomer (2) from the overflow pipe (12) and is discharged out of the system. The present invention is also designed with the gas guide cone (10) and the vent holes (11). When the gas velocity is high, part of the gas can be entrained into the downcomer (2) by the circulating liquid and enters the upper part of the hydrocyclone (13). This can effectively avoid the situations of limited reaction rate resulted from an insufficient mass transfer. The gas guide cone (10) is a conical structure with a taper angle of 30°. After the fluids flow through it, the gas gathers at the space with the included angle between the gas guide cone (10) and the downcomer wall (2) and enters the riser (1) from the downcomer (2) via the vent holes (11), thereby preventing gas from entering the hydrocyclone (13), and keeping a good separation performance of the hydrocyclone (13).

Embodiment 2

In the embodiment, after passing the gas-liquid integrated distributor (15), gas enters the riser of the internal loop airlift reactor from an internal cylinder, and the slurry, driven by the gas, flows from the riser (1) to the downcomer (2). A seal structure is formed between the cylindrical segment of the hydrocyclone (13) and an inner wall of the downcomer (2). The slurry, horizontal tangent to the column, enters the hydrocyclone (13) from the two hydrocyclone inlets (4). The internals (5) preventing the occurrence of dead zone can effectively prevent the catalyst particles from accumulating at the lower part of the underflow pipe (14) of the hydrocyclone and introduce them back into the riser. Therefore, the catalyst can be recycled. After separation, the slurry containing solid catalyst particles is discharged from the underflow pipe (14) of the hydrocyclone and again enters the riser for the next cycle. The product after reaction as a light phase passes through the hollow structure between the hydrocyclone (13) and the downcomer (2) from the overflow pipe (12) and is discharged. In this apparatus, the annulus downcomer (2) is provided with four hydrocyclones (13), which can increase the throughput of the reactor. The gas guide cone (10) is a conical structure with a taper angle of 45° and is uniformly distributed outside of the draft tube cylinder (9). When the gas velocity is high, after the fluid flows through it, the gas gathers at the space with the included angle between the gas guide cone (10) and the downcomer wall (2) and enters the riser (1) from the downcomer (2) via the vent holes (11), thereby preventing gas from entering the hydrocyclone (13), and ensuring a good separation performance of the hydrocyclone (13).

In spite of the above description of the specific embodiments of the present invention in conjunction with the accompanying drawings, it is not intended to limit the scope of the present invention. Those skilled in the art should understand that various modifications or variations that can be achieved without creative effort on the basis of the technical solutions of the present invention are still within the scope of the present invention.

The invention claimed is:

1. An internal loop airlift reactor for process intensification integrating reaction and separation, comprising a riser, a downcomer, a solid feed inlet, a hydrocyclone inlet, internals preventing the occurrence of dead zone, a liquid inlet, a gas inlet, a gas outlet, a draft tube, a gas guide cone, vent holes, an overflow pipe, a hydrocyclone, an underflow pipe, a gas-liquid integrated distributor and a liquid outlet, wherein the riser and the downcomer are separated by the draft tube; the solid feed inlet is disposed on a side wall of the reactor; the liquid inlet and the gas inlet are disposed at the bottom of the reactor; the gas outlet is disposed at the top of the reactor; a liquid outlet connects the hydrocyclone and the overflow pipe and introduces the clear liquid to the outside of the reactor; the hydrocyclone is arranged at the lower part of the downcomer; the space between a upper surface of a cylindrical segment of the hydrocyclone and a wall of the downcomer is sealed except for inlets; the gas guide cone is arranged on an inner wall of the downcomer; the vent holes are designed in the inner wall of the downcomer and arranged below the gas guide cone; and the gas-liquid integrated distributor connects both the liquid inlet and the gas inlet and is arranged at the bottom of the riser of the reactor.

2. The internal loop airlift reactor for process intensification integrating reaction and separation according to claim 1, wherein the fluid rises in an annulus rising or center rising manner.

3. The internal loop airlift reactor for process intensification integrating reaction and separation according to claim 1, wherein the internals preventing the occurrence of dead zone is arranged below the underflow pipe of the hydrocyclone.

4. The internal airlift loop reactor for process intensification integrating reaction and separation according to claim 1, wherein the bottom surface area of the internals preventing the occurrence of dead zone is larger than the sectional area of the downcomer, and the base angle is about 15°-45°.

5. The internal loop airlift reactor for process intensification integrating reaction and separation according to claim 1, wherein the structure size and number of the hydrocyclone can be adjusted according to the handling capacity.

6. The internal loop airlift reactor for process intensification integrating reaction and separation according to claim 1, wherein the hydrocyclone is designed with at least one inlet.

7. The internal loop airlift reactor for process intensification integrating reaction and separation according to claim 1, wherein the gas guide cone is installed at about 200-500 mm above the hydrocyclone, and the taper angle of the gas guide cone is about 15°-45°.

8. The internal loop airlift reactor for process intensification integrating reaction and separation according to claim 1, wherein the vent holes are about 2-10 mm below the gas guide cone in the downcomer, arranged in 4-12 circular arrays and have a diameter of about 1-10 mm.

9. The internal loop airlift reactor for process intensification integrating reaction and separation according to claim 1, wherein a hollow structure is present between a taper portion of the hydrocyclone and the downcomer, and a separated light phase product is led out via the structure.

10. The internal loop airlift reactor for process intensification integrating reaction and separation according to claim 2, wherein the internals preventing the occurrence of dead zone is arranged below the underflow pipe of the hydrocyclone.

11. The internal airlift loop reactor for process intensification integrating reaction and separation according to claim 2, wherein the bottom surface area of the internals preventing the occurrence of dead zone is larger than the sectional area of the downcomer, and the base angle is about 15°-45°.

12. The internal loop airlift reactor for process intensification integrating reaction and separation according to claim 2, wherein the structure size and number of the hydrocyclone can be adjusted according to the handling capacity.

13. The internal loop airlift reactor for process intensification integrating reaction and separation according to claim 2, wherein the hydrocyclone is designed with at least one inlet.

14. The internal loop airlift reactor for process intensification integrating reaction and separation according to claim 2, wherein the gas guide cone is installed at about 200-500 mm above the hydrocyclone, and the taper angle of the gas guide cone is about 15°-45°.

15. The internal loop airlift reactor for process intensification integrating reaction and separation according to claim 2, wherein the vent holes are about 2-10 mm below the gas guide cone in the downcomer, arranged in 4-12 circular arrays and have a diameter of about 1-10 mm.

16. The internal loop airlift reactor for process intensification integrating reaction and separation according to claim 2, wherein a hollow structure is present between a taper portion of the hydrocyclone and the downcomer, and a separated light phase product is led out via the structure.

* * * * *